United States Patent [19]

Harvey

[11] Patent Number: 5,070,350

[45] Date of Patent: Dec. 3, 1991

[54] FIELD CURVATURE EFFECTS MINIMIZED IN TELE/PAN CAMERA

[75] Inventor: Donald M. Harvey, Webster, N.Y.

[73] Assignee: Eastman Kodak Company, Rochester, N.Y.

[21] Appl. No.: 681,654

[22] Filed: Apr. 8, 1991

Related U.S. Application Data

[63] Continuation of Ser. No. 468,344, Jan. 22, 1990, abandoned.

[51] Int. Cl.⁵ .............................................. G03B 1/18
[52] U.S. Cl. .................................................. 354/195.1
[58] Field of Search .............................. 354/195.1, 295

[56] References Cited

U.S. PATENT DOCUMENTS

| | | | |
|---|---|---|---|
| 2,289,133 | 7/1942 | Lessler et al. | 354/195.1 |
| 3,048,092 | 8/1962 | Gottschalk | 354/195.1 |
| 3,598,031 | 8/1971 | Harvey | 354/195.1 |
| 3,738,241 | 6/1973 | Behnsen | 354/195.1 |
| 4,426,145 | 1/1984 | Hashimoto | 354/195.1 |
| 4,650,304 | 3/1987 | Harvey | 354/21 |

FOREIGN PATENT DOCUMENTS 2152696A 8/1985 United Kingdom ............ 354/195.1

*Primary Examiner*—L. T. Hix
*Assistant Examiner*—Howard B. Blankenship
*Attorney, Agent, or Firm*—Roger A. Fields

[57] ABSTRACT

Insertion of a planar element of plastic into the optical path between camera taking lens and the film, or rack and pinion rotation of the lens is a threaded lens mount, under the control of the device by which the user selects that particular pseudo or other image, adjusts the compromise setting of the lens to provide improved focus in the film area receiving the selected type of image.

7 Claims, 3 Drawing Sheets

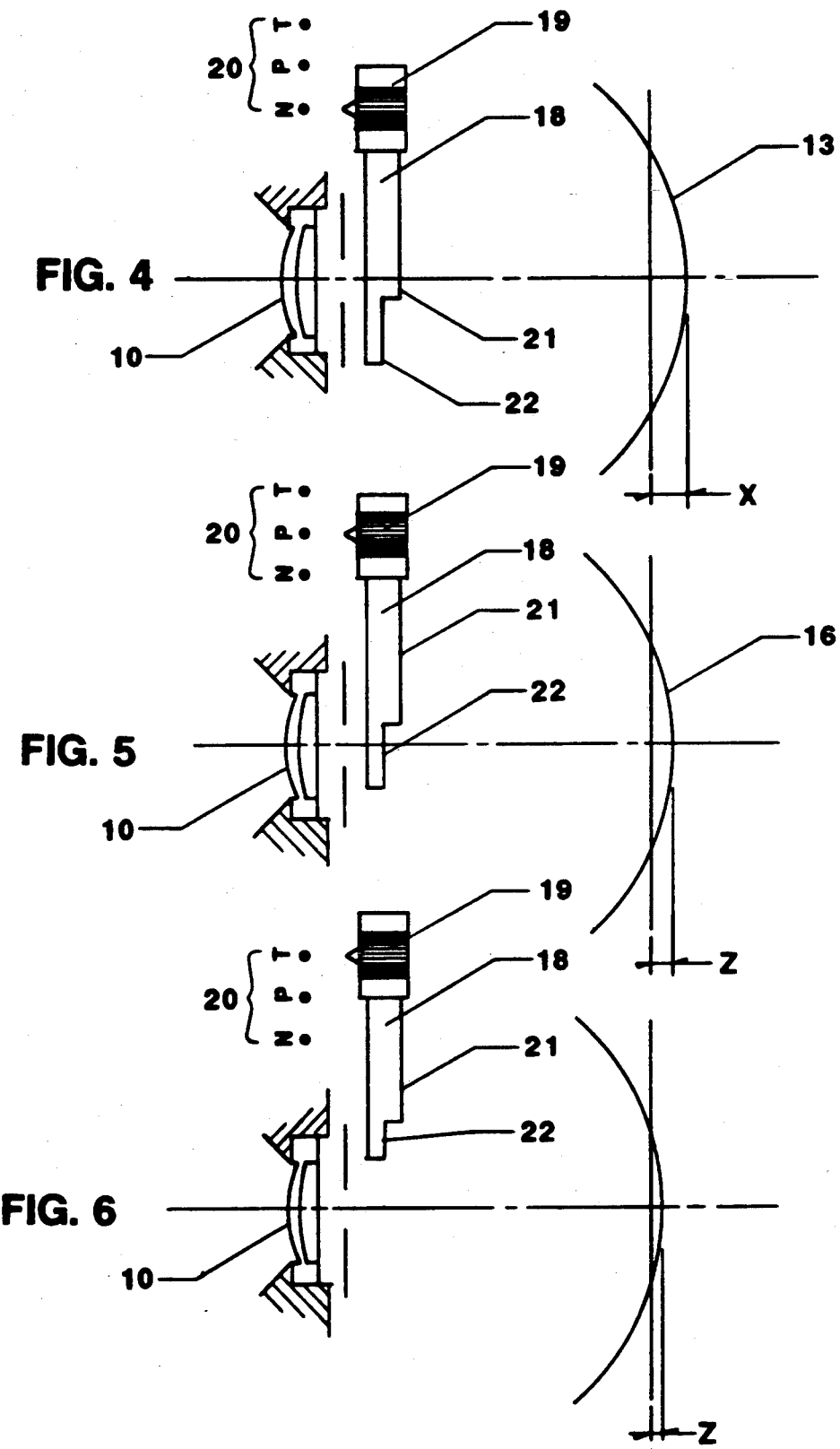

FIELD CURVATURE EFFECTS MINIMIZED IN TELE/PAN CAMERA

This is a continuation of application Ser. No. 07/468,344, filed Jan. 22, 1990 now abandoned.

BACKGROUND OF THE INVENTION

1. Field of the Invention

The invention relates to selectively improving overall image sharpness in a camera used in making pseudo format images such as pseudo telephoto format and pseudo panoramic format images. In such pseudo images, only a selected portion of the exposed film frame contains the image portion to be viewed, either directly or by printing concerned with cameras wherein the lens focus suffers from such large magnitude field curvature that the film plane is located at a compromise position in which some image sharpness at the center is sacrificed for better average overall sharpness. Such field curvature would ordinarily be encountered in a low cost lens. The invention provides means for adjusting lens focus in a simple, inexpensive manner, as the user selects the desired type of image, such that the compromise is adjusted to provide improved average sharpness in the film area which will receive the particular image type selected by the user.

2. Description of the Prior Art

I am not aware of any prior art teaching the concept of this invention. A discussion of pseudo photography can be found in U.S. Pat. No. 4,650,304, issued Mar. 17, 1987. As discussed in that patent, a pseudo telephoto print is one that is made from a central portion of an exposure having the same width-to-length ratio, e.g. 3½:5, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving a narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

SUMMARY OF THE INVENTION

According to the invention, I improve camera of the type which takes pseudo images in different formats, such as pseudo telephoto format and pseudo panoramic format images. Low cost cameras of such type use inexpensive lenses which ordinarily suffer from field of such large magnitude, meaning that their focus is not planar, but is curved to the extent that the camera is designed with focus at a compromise position, sacrificing some sharpness at the center of the image to provide better average sharpness overall.

If a normal (non-pseudo) image is selected, the center focus would be substantially behind the film plane and the edge focus would be substantially in front of the film plane.

When only a central portion of the film frame is to be printed, as in a pseudo telephoto format image, a better compromise is attained by averaging the sharpness only over the area to be printed, namely, the central area of the film frame, leaving the edges to be much more out of focus than for a normal image, since the edge area will not be printed. This is accomplished by moving the central focus closer to the film plane.

In the panoramic format mode, a bit less adjustment by movement of central focus would be made, as the width of the area to be printed would be narrow from top to bottom, and would be wider than in tele mode but narrower than in the normal mode. According to my invention, I provide on the camera, format selecting means controlled by the user, and means operated by the selecting means for placing the center focus of the lens at an optimum spacing from the film plane for the format selected, to optimize the focus over the film plane area which receives the image for that format.

The foregoing explains the inventive concept, which can be carried out in various ways. In a preferred embodiment planar plastic means is inserted between the lens and the film, the thickness of which planar means determines the amount of focus adjustment. The planar material is optically clear and conveniently is a synthetic plastic material. The insertion is controlled by the device used by the operator to select the desired type of image.

Another way of carrying out the invention is to mount the camera lens in a threaded mount and provide rack and pinion lens rotating means under the control of the device for selecting the type of image (mode selector).

BRIEF DESCRIPTION OF THE DRAWINGS

The invention will be described in connection with the appended drawings, in which:

FIG. 4 is a view similar to FIG. 1, but showing insertion of an element of clear plastic material into the light path for a normal exposure;

FIG. 5 is a view similar to FIGS. 2 and 4, but showing a thinner portion of the plastic material inserted for the panoramic mode;

FIG. 6 is a view similar to FIGS. 3, 4 and 5, but showing the Plastic element is an inoperative position;

DESCRIPTION OF THE PREFERRED EMBODIMENT

The invention is disclosed as being embodied in a low priced camera, in which minimum manufacturing cost is essential. In such cameras, a very inexpensive lens must be used. The manufacturing cost of a sophisticated lens with multiple elements to achieve flat field is unacceptable. Unfortunately, simple, inexpensive lenses suffer from large magnitude field curvature, that is, the sharpest focus lies in a curve, rather than a plane. With such lenses, the film plane and the lens would ordinarily be located in such positions with relation to each other that the curved field is in a compromise position relative to the film plane, the center of the curve (centers focus of the lens) being behind, and the edge focus of the lens being in front of, the film plane. In such position, some sharpness in the center is sacrificed for better average sharpness overall.

Figure 1:
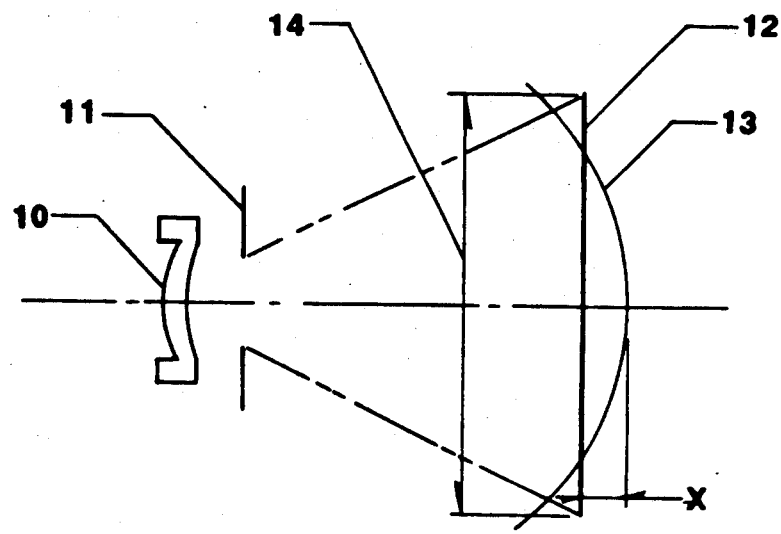
FIG. 1 shows diagrammatically a camera, illustrating the light path and compromise focus for best overall average sharpness over the entire film frame area.

Referring now to FIG. 1, there is indicated a camera lens 10 of a simple, inexpensive type. The aperture is indicated at 11, and the film plane is at 12. The "plane" of best focus is not a plane but is a curve indicated in exaggerated degree for clarity at 13. Dimensional arrow 14 indicates the diagonal of the film frame area to be printed (full area in this case). The spacing of the center of the curve (center focus of the lens with relation to the film plane is indicated at x. This is the largest spacing of any of the modes illustrated, being for the normal mode, that is, exposing a negative of which the entire frame will be printed.

Figure 2:
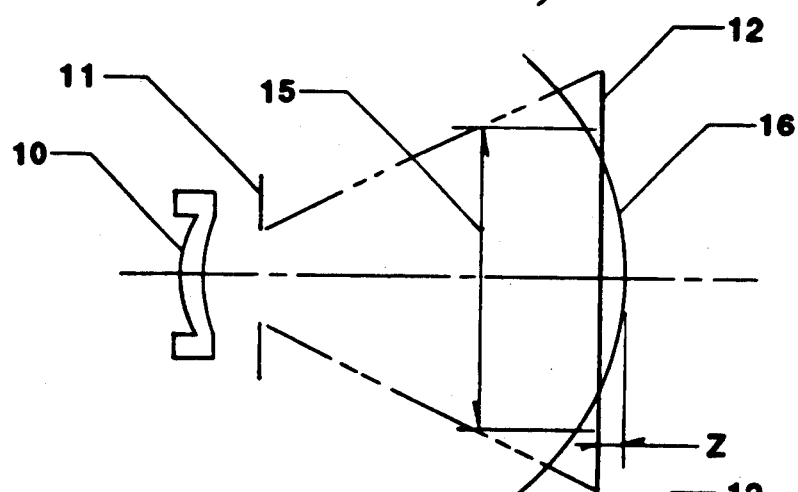
FIG. 2 is similar to FIG. 1, but illustrating compromise focus for pseudo panoramic mode.

FIG. 2 shows the reduced film area diagonal of the image that is to be printed in the pseudo panoramic mode. In this mode, an elongated (from side-to-side) area of narrower dimension from top to bottom will be printed, giving the appearance of a panoramic photograph. Note that the location of the curve of best focus has been moved from the position shown in FIG. 1, so as to provide the best compromise focus only over the diagonal of the area to be printed, this being indicated at 15 and the new focus curve location being at 16. At the center of the film frame, the curve is closer to the film plane than in the normal mode, as indicated at Z.

Figure 3:
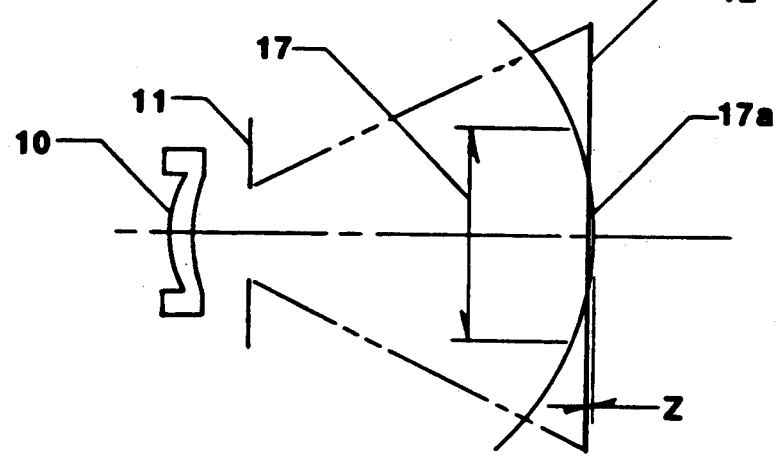
FIG. 3 is similar to FIGS. 1 and 2, but illustrating compromise focus for tele mode.

FIG. 3 shows the desired relocation of the focus curve 17a for the pseudo tele mode. In this case, only a central area of the film frame will be printed, as indicated by the shorter diagonal dimension indication 17. In this case the spacing Z has been reduced even more, since average sharpness is now concerned with a still smaller area to be printed. It will not matter that the image in the film areas outside the small area indicated by 17 will be severely out of focus, as these areas will not be printed, as was also the case for the areas outside the pan mode area.

In a preferred embodiment, I achieve the desired positioning of the focus curve by inserting element 18 to improve the location of the focus curve. The element (which could consist of more than one element) is inserted between the lens and the film. It is a planar piece of optically clear material, conveniently of synthetic material. The element 18 is mounted in the camera for movement with a mode setting selector 19 (image type selecting means) by which the user selects the image type that he wants to have printed. In this case, the image type selector, which of course is located on the outer casing of the camera so as to be user accessible, cooperates with indicia 20 which indicate normal, panoramic and tele image types. Movement of the selector moves the element 18 in the space between the lens and the film and transversely of the optical axis of the lens.

Element 18 has a thicker portion or area 21 and a thinner portion 22. It will be noted that the particular area, 21 or 22 positioned to affect light passing to the film, depends on the mode selected by the user.

As shown in FIG. 4, for normal mode use, in which the entire film frame will be printed, the thicker area 21 is at operable position. In FIG. 5, the panoramic mode has been selected and the thinner area 22 of element 18 is at operable position between the lens and the film. In FIG. 6, element 18 has been withdrawn entirely to an inoperable position for a pseudo tele exposure. Thus in the example shown, the design provided the best average sharpness for the particular mode selected, the focus being adjusted by interposing the plastic element to a suitable extent or removing it.

The plastic element 18 is dimensioned in accordance with the following equation $$\text{thickness} = x - z(n/n-1)$$

wherein n is the optical index of the plastic element, z is the desired spacing of the center focus of the lens from the film plane for the particular image selected, and x is the largest acceptable spacing of the central image focus from the film plane for the various formats for which the camera is to be used, this being the spacing in the normal mode for the embodiment disclosed. "Thickness" is measured along the lens axis, that is, perpendicular to the film plane. The lens axis is indicated by a horizontal line extending through the center of the lens in each Fig. of the drawings.

Figures 7, 8:
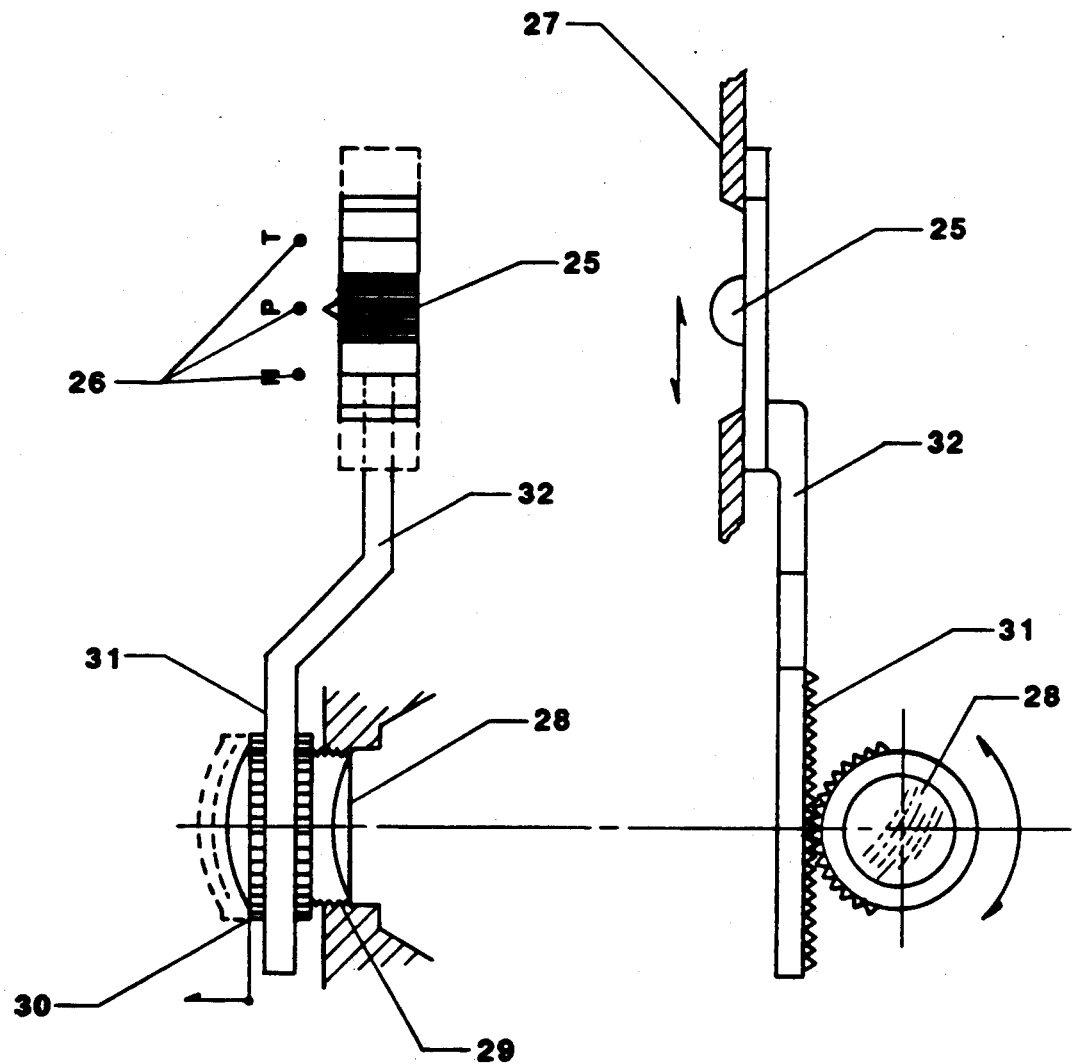
FIG. 7 shows schematically rack and pinion means for focus adjustment under control of the mode selector.
FIG. 8 is another view of the rack and pinion device shown in FIG. 7.

In FIGS. 7 and 8 I have illustrated another mode of carrying out the invention. In this case the mode setting selector is indicated at 25, with the setting indicating indicia at 26. The camera wall is indicated at 27. Lens 28 is in a threaded mounting 29 such that rotation of the lens causes a change in focus. An annular portion 30 of the lens assembly has gear teeth about its periphery. These teeth engage a rack 31 carried by a link 32 to selector 25.

In operation, sliding movement of selector 25 during mode selection causes rack movement to rotate gear 30 and lens 28, causing focus adjustment.

The invention has been described with reference to a preferred embodiment. However, it will be appreciated that variations and modifications can be effected within the ordinary skill in the art without departing from the scope of the invention.

I claim:

1. Apparatus for improving overall image sharpness at the film plane in a camera which exposes film frames to record pseudo format images, such as pseudo telephoto and pseudo panoramic format images, as selected by camera user operated format changing means, which images will be printed from less than all of the image area of exposed film frames, different film frame portions, smaller than the full film frame, being printed for different pseudo format images, said camera having a taking lens, the field curvature of which at the film plane is of such large magnitude that the lens focus is at a compromise position which provides substantially unsharp pseudo format images unless specially adjusted for each type of pseudo image, center focus of the lens normally being substantially spaced from the film plane in one direction and edge focus being substantially spaced from the film plane in the opposite direction; said apparatus comprising:

means under the control of said format changing means, for moving the center focus of the lens to a position of optimum spacing from the film plane substantially only for the film frame portion to be printed in the pseudo format selected, so as to provide the best overall focus and improved average sharpness substantially only in the film frame portion used for that format.

2. Apparatus as set forth in claim 1, wherein said format changing means moves said center focus closer to the film plane for pseudo telephoto format than for pseudo panoramic format.

3. Apparatus as set forth in claim 2, wherein said means for moving the center focus of the lens comprises an element of optically clear, planar material inserted between between the lens and the film plane.

4. Apparatus as set forth in claim 3, wherein said element has two portions of different thickness.

5. Apparatus as set forth in claim 1, wherein said means for moving the center focus of the lens comprises means for moving the lens toward and away from the film plane.

6. A camera for making pseudo images such as pseudo telephoto and pseudo panoramic format image which will be printed from less than the full image area of film frames exposed at the camera's film plane, different film frame portions, smaller than the full film frame area, being printed for different pseudo format images; said camera comprising:

a taking lens, the field curvature of which at the film plane is of such large magnitude that the lens focus is at a compromise position which produces substantially unsharp images unless specially adjusted for each type of pseudo format image, center focus of the lens normally being substantially spaced from the film plane in one direction and edge focus being substantially spaced from the film plane in the opposite direction, camera user operated format changing means, and means under the control of said format changing means, for moving the center focus of the lens to a position of optimum spacing from the film plane substantially only for the film frame portion to be printed in the pseudo format selected, so as to provide the best overall focus and average sharpness substantially only in the film frame portion used for that format.

7. A camera as set forth in claim 6, wherein said format changing means moves said center focus closer to the film plane for pseudo telephoto format than for pseudo panoramic format.

* * * * *